United States Patent
Heusermann et al.

(10) Patent No.: US 7,366,727 B2
(45) Date of Patent: *Apr. 29, 2008

(54) MANAGEMENT OF INBOUND CONFLICTS WHEN MERGING DATA OF DISTRIBUTED SYSTEMS

(75) Inventors: Knut Heusermann, Rauenberg (DE); Klaus Irle, Walldorf (DE); Gordon Muehl, Oestringen (DE); Wolfram Siefke, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 632 days.

This patent is subject to a terminal disclaimer.

(21) Appl. No.: 10/800,311

(22) Filed: Mar. 12, 2004

(65) Prior Publication Data

US 2005/0203911 A1 Sep. 15, 2005

(51) Int. Cl.
*G06F 17/30* (2006.01)
*G06F 7/00* (2006.01)

(52) U.S. Cl. ............... 707/101; 707/204; 707/203

(58) Field of Classification Search .............. 707/204, 707/203, 101
See application file for complete search history.

(56) References Cited

U.S. PATENT DOCUMENTS

| | | | |
|---|---|---|---|
| 4,789,986 A * | 12/1988 | Koizumi et al. ............ 714/797 |
| 5,649,102 A | 7/1997 | Yamauchi et al. | |
| 5,787,262 A | 7/1998 | Shakib et al. | |
| 6,457,065 B1 | 9/2002 | Rich et al. | |
| 6,859,455 B1 * | 2/2005 | Yazdani et al. ............ 370/392 |
| 6,892,210 B1 * | 5/2005 | Erickson et al. ........... 707/201 |
| 6,918,006 B1 * | 7/2005 | Archibald et al. ......... 711/114 |
| 6,954,765 B2 * | 10/2005 | Spiegel ...................... 707/200 |
| 6,993,522 B2 * | 1/2006 | Chen et al. .................... 707/7 |
| 2002/0042910 A1 | 4/2002 | Baumeister et al. | |
| 2002/0087603 A1 | 7/2002 | Bergman et al. | |

(Continued)

FOREIGN PATENT DOCUMENTS

EP 0 943 993 9/1999

(Continued)

OTHER PUBLICATIONS

Masslin, Henry, "A Lock-Free Multiprocessor OS Kernel," Jun. 19, 1991, [online], [retrieved from the Internet Apr. 22, 2004: http://citeseer.ist.psu.edu/massalin91lockfree.html], XP002277589. cited by other.

(Continued)

*Primary Examiner*—Miranda Le
*Assistant Examiner*—Kuen S Lu
(74) *Attorney, Agent, or Firm*—Finnegan, Henderson, Farabow, Garrett & Dunner, L.L.P.

(57) ABSTRACT

A method, a computer program, a computer program product, and a system for checking data consistency of data objects of distributed systems within a computer network are disclosed. System objects may be automatically merged with inbound objects by sending a first data object from a first system to a second system, storing a copy of the first data object within the second system, generating a second data object from the first data object, sending the second data object in the copy to the first system, and comparing at least one data package of the first data object with at least one data package of the received copy using a consistency check operation stored within the first data object, the second data object, or the copy.

37 Claims, 3 Drawing Sheets

U.S. PATENT DOCUMENTS

2002/0120648 A1    8/2002  Ball et al.
2002/0169995 A1*  11/2002  Archibald et al. ............. 714/6
2003/0004990 A1    1/2003  Draper
2003/0115547 A1    6/2003  Ohwada et al.
2004/0054967 A1    3/2004  Brandenberger
2004/0205539 A1   10/2004  Mak et al.
2005/0033828 A1*   2/2005  Watanabe ................... 709/219

OTHER PUBLICATIONS

Office Action dated Jun. 15, 2005.

* cited by examiner

MANAGEMENT OF INBOUND CONFLICTS WHEN MERGING DATA OF DISTRIBUTED SYSTEMS

FIELD OF THE INVENTION

The present invention relates generally to methods and systems for checking data consistency of data objects of distributed systems within a computer network.

BACKGROUND

Generally, in large computer networks, such as those for business applications, several different and separate computer-based systems may be involved. These systems generally run computer programs that use data objects. Such computer programs may include systems or software that involve heavy data transmission within the computer networks, such as Enterprise Resource Planning (ERP) systems. With computer networks, data replication may be used to reduce network traffic between systems and software, as not all data objects have to be transmitted for each operation. However, the more data is replicated within a network, the greater the chance that communicating systems or software will rely on inconsistent data or data will become corrupted. When this happens, important data may be lost.

In addition, within a distributed computer system, data objects used by several different systems may change over time without each system having knowledge of the changes made by the other systems. These changes may result in different object states. When, at a certain point in time, a system receives a message comprising a data object that is already stored within this system, problems occur when trying to merge these data objects. The problems and difficulties occurring during merging may be that the data objects look differently with respect to the last time the two systems exchanged data objects. In this case changes may be overwritten, or may lead to data inconsistencies. This leads to time-consuming staging processes, and can necessitate undesired user interaction.

To avoid these problems, some prior art systems lock data objects on a current system when replicated data objects are used within distributed systems. This locking ensures that the respective data objects may only be read and not changed on the current system. The lock on a data object may be resolved when the data object from the distributed system is received within the current system and the contents are merged. This merger usually results in overwriting the data object of the current system with data of the data object (of the distributed system) that has been changed. However, locking data objects results in loss of system performance.

SUMMARY OF THE INVENTION

The present invention provides methods and systems for checking data consistency of data objects of distributed systems within a computer network. Methods and systems consistent with the present invention may include receiving in a second system a copy of a first data object stored in a first system, storing a copy of the first data object within the second system, generating a second data object from the first data object, sending the second data object and the copy to the first system, and comparing at least one data package of the first data object with at least one data package of the copy of the first data object sent by the second system using a consistency check operation stored within the first data object, the second data object, or the copy of the first data object.

The present invention also provides methods and systems for comparing packages of said data objects using a consistency check operation. This consistency check operation may be stored within the data objects themselves. In certain embodiments, the data objects may be separated into data packages. This may be done during design-time and/or during the customization of said data objects. Each data package may comprise parts of the object data and/or sub-packages. All elements of one data package may be coupled with a package condition, which could be a common consistency condition, logical dependencies, or common business content.

The data packages may also include a consistency operation which defines the conditions that are intended to be the conditions for ruling packages to be consistent or not. By checking the consistency of the data packages of the data objects, the data objects may be compared automatically. As the data packages may comprise less data than a whole data object, it is easier to decide whether two packages are consistent or not. Changes effecting only some parts of the data objects may not result in inconsistencies. This may be accounted for by a) defining appropriate data packages, e.g. which data is packed into one of such packages, and b) defining an appropriate consistency check operation for the particular data packages. On the other hand, some parts of a data objects are highly relevant and changes to these parts necessarily result in inconsistencies. For such data packages, a consistency check operation may be defined resulting only in a consistency approval in case of a match of the particular data, otherwise the data may be defined as not consistent.

BRIEF DESCRIPTION OF THE DRAWINGS

The accompanying drawings, which are incorporated in and constitute a part of this specification, illustrate various embodiments of the invention and, together with the description, serve to explain the principles of the invention. In the drawings.

DETAILED DESCRIPTION OF THE INVENTION

Figure 1:
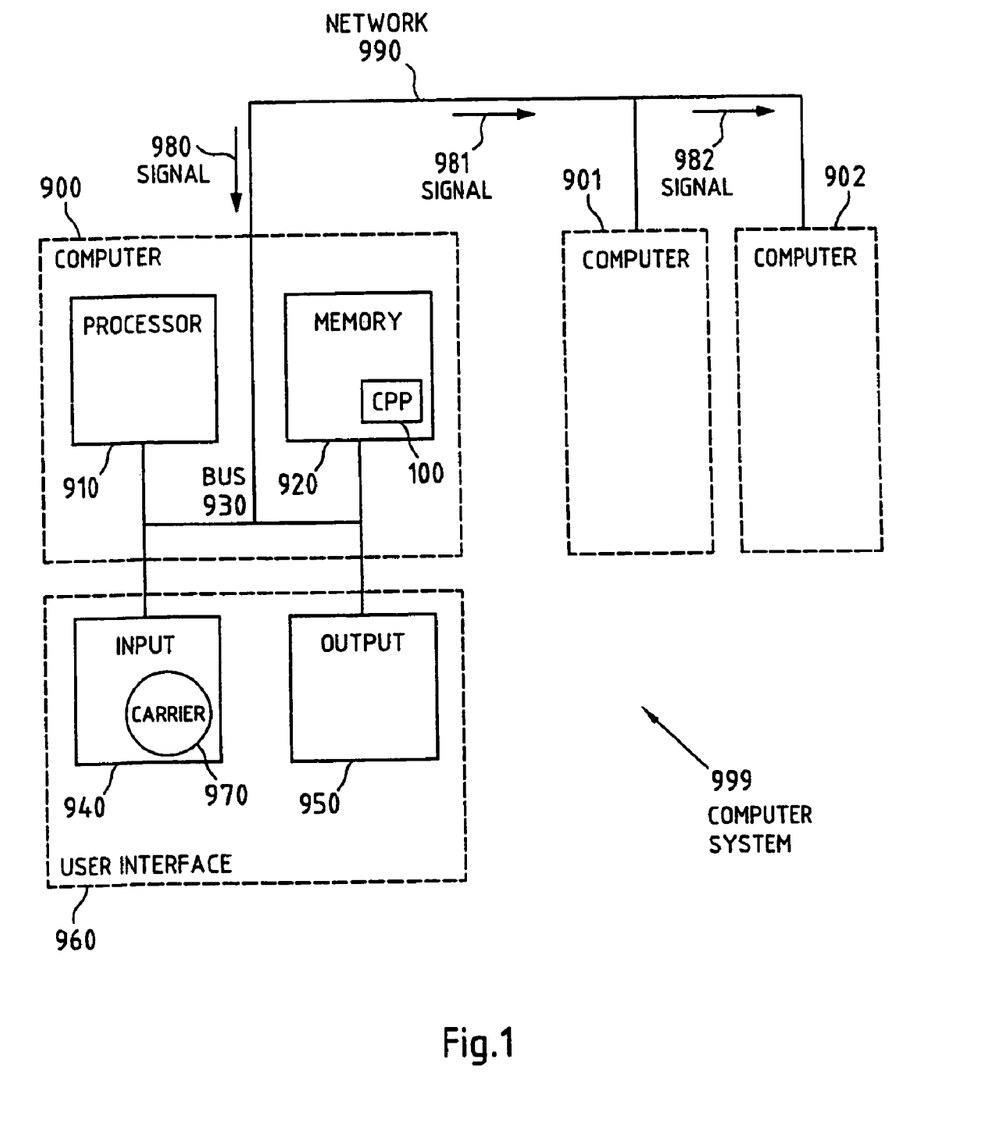
FIG. 1 is a block diagram illustrating an exemplary computer system used to implement one or more embodiments of the present invention.

FIG. 1 illustrates a simplified block diagram of an exemplary computer system 999 for implementing the principles of the present invention. As shown in FIG. 1, computer system 999 may have a plurality of computers 900, 901, 902 (or even more). Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

With respect to computer 900, computer 901/902 is sometimes referred to as a "remote computer." Computer 901/902 may be, for example, a server, a peer device or other common network node, and may have many or all of the elements described relative to computer 900.

Computer 900 may be, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 may be, for example, a central processing unit (CPU), a micro-controller unit (MCU), a digital signal processor (DSP), or the like.

Memory 920 may be one or more elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk-DVD); (c) semiconductor media, like DRAM, SRAM, EPROM, EEPROM, memory stick.

Optionally, memory 920 can be distributed. Portions of memory 920 can be removable or non-removable. For reading from media and for writing in media, computer 900 may use well-known devices such as, for example, disk drives, tape drives, etc.

Memory 920 stores modules such as, for example, a basic input output system (BIOS), an operating system (OS), a program library, a compiler, an interpreter, and a text-processing tool. Such modules are commercially available and can be installed on computer 900. As they are well known in the state of the art, such modules are not illustrated in FIG. 1.

CPP 100 has program instructions and, optionally, data that cause processor 910 to execute method steps consistent with the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 may be conveniently inserted into input device 940.

Carrier 970 may be implemented as any computer-readable medium, such as a medium largely explained above (cf. memory 920). Carrier 970 may be an article of manufacture having a computer-readable medium with computer-readable program code to cause the computer to perform methods of the present invention. Further, signal 980 can also embody computer program product 100.

Examples of CPP 100, carrier 970, and signal 980 have been described in connection with computer 900. However, other type of carriers and signals may embody computer program products (CPP) to be executed by further processors in computers 901 and 902.

Input device 940 provides data and instructions for processing by computer 900. Device 940 can be, for instance, a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optionally, as they may or may not pertain to various embodiments of the present invention.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network may be electrical, electromagnetic, optical or wireless (radio) signals.

Networks are commonplace in offices, enterprise-wide computer networks, intranets and the Internet (e.g., world wide web or WWW). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known and may include, for example, transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art, and not shown in FIG. 1. An interface can be, for example, a serial port interface, a parallel port interface, a game port, a universal serial bus (USB) interface, an internal or external modem, a video adapter, or a sound card.

Computers and the programs that operate them are closely related. As used hereinafter, phrases, such as "the computer provides" and "the program provides," are used interchangeably to express actions by a computer that is controlled by a program.

Figure 2A:
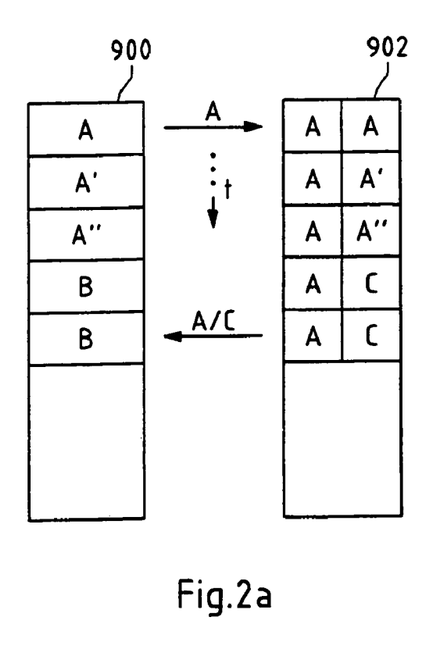
FIGS. 2a and 2b are diagrams illustrating exemplary data structures, according to one or more embodiments of the present invention.

FIGS. 2a and 2b are diagrams illustrating exemplary data structures, according to one or more embodiments of the present invention. As shown in the exemplary embodiment of FIG. 2a, a source system 900 sends a data object A (hereinafter referred to as before-image object data BIOD) without knowledge of, or restrictions to, the target system 902. Target system 902 maintains said BIOD A of the received data object and may manipulate the BIOD A thereafter. During operation, BIOD A will be altered and will become data object C (hereinafter referred to a message object data MOD). The target system 902 returns MOD C and BIOD A to the source system 900. The source system 900 determines, using an inbound evaluation process, whether BIOD A matches a current state of a data object B (hereinafter referred to system object data SOD) in the source system 900. SOD B is a descendant of BIOD A, which was subject to changes within system 900. If there is a match between SOD B and MOD A, e.g. between data packages thereof, the source system 900 may accept MOD C without the need for manual revision.

Certain embodiments of methods and systems consistent with the present invention provide certain advantages. With certain embodiments, for example, an owner/operator of data object does not need to lock data objects that are sent to a third party. The third party simply hands back the data objects together with a before image that describes the state of the data objects when received. When checking in the data, the owner/operator applies automatic consistency checks, which are available to all data objects. However, the owner/operator can restrict precious resources of manual and advanced tool-based checks to the real critical objects, e.g. the ones that have changed with respect to their before images, and especially the ones where the current status at the owner/operator is different from the before-image that describes the object when it had been checked out. In these cases there is the highest risk that modifications by the third part contradict the modifications that the object has meanwhile undergone at the owner/operator's site.

Principles of the present invention may find application in any type of computer systems including, for example, an Enterprise Resource Planning (ERP) system. In general, ERP is an industry term describing a broad set of activities supported by multi-module application software that helps a manufacturer or other business manage important parts of its business, including product planning, parts purchasing, maintaining inventories, interacting with suppliers, providing customers service, and tracking orders. An ERP system can also include application modules for controlling or managing finance and human resources aspects of a business. Typically, an ERP system uses, or is integrated with, a data base management system.

An example of an ERP system is the integrated business solution my SAP.com from SAP Aktiengesellschaft. In an ERP system, business processes are modeled in business objects. Instances of the business object are represented in data generated, stored and manipulated by the system. Typically, the systems that form part of the network each include a data base, as discussed above, in which data related to instances of the business objects are stored.

Object data generally refers to a set of data representing any object, such as an asset, or a part of an object, such as location data. Object data may include, for example, a document or a part of a document, a data collection of attributes, references and/or links, or a set of data collections with a common consistency condition. Other object data examples include a pure structure representation, such as nodes and edges, and a complete structure including all of its elements, such as nodes, edges, linked or included data objects.

In these exemplary systems, an object may be changed several times in a particular time period, and each data change may generate a new object state.

Overall, in such systems, each system 900, 902 generates, maintains, utilizes and shares data within the network. The systems 900, and 902 can change the same object data A at the same time or over long periods of time without knowledge of changes made by each other. This can result in difficulties during any merging process, because the appearance of an object may have changed since the last point of correspondence between two systems. In addition, changes can be overwritten and may lead to inconsistencies that necessitate staging, i.e., time consuming manual checking of the data or the discarding of the data.

To avoid or minimize the above difficulties, embodiments consistent with the present invention may carry out data consistency checks on the pieces of data exchanged between the systems 900, 902. As time t progresses, system 900 may deliver BIOD A to system 902. Upon receipt of BIOD A from system 900 system 902 copies the BIOD A. The BIOD A may include data as well as context. The context may include various types of information such as, for example, version number, format, and relationship information. Furthermore, within BIOD A, a consistency check operation OP and a reaction R may be stored. Reactions on the consistency check result may be stored within the object, as well as within one or more data packages. The reaction R defines how to handle a data object or a data package in case of a certain consistency check operation result. These rules may allow merging the data objects automatically. For instance, for less relevant packages, it may be possible to allow discarding of the changed data or the original data by overwriting with the original data or changed data, respectively. For packages that are important or highly relevant, the reaction may result in discarding the merging process if the consistency check operation finds out that the data objects as not consistent.

Figure 3A:
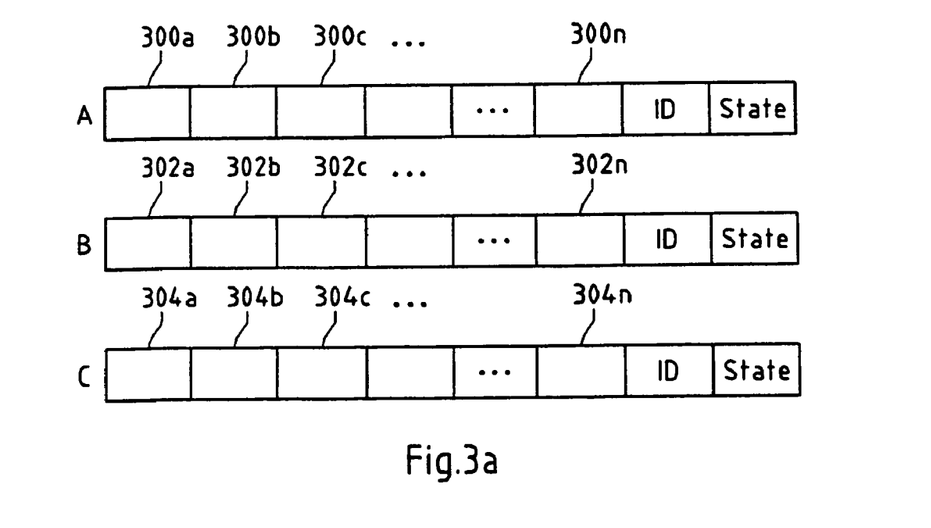
FIGS. 3a and 3b are illustrations of the data structures of a data object and a data package, respectfully, according to one or more embodiments of the present invention.

As time t progresses, system 902 may manipulate, modify and/or change BIOD A received from system 902 and generate MOD C. During the same time interval that system 902 generates MOD C, system 900 may manipulate also BIOD A by executing applications or processes in its engine, generating SOD B. When system 902 returns MOD C to system 900 it also returns the stored BIOD A. Upon receiving MOD C and BIOD A, system 900 compares the state of received BIOD A with the current state of the corresponding data in system 900, i.e. SOD B. This comparison between BIOD A and SOD B may be carried out by using a consistency check operation stored within BIOD A. Each data object A, B, C may comprise a plurality of packages, as will be described in FIG. 3. For each package, a consistency check operation as well as a reaction assigned to a certain result of said consistency check operation may be stored.

Figure 2B:
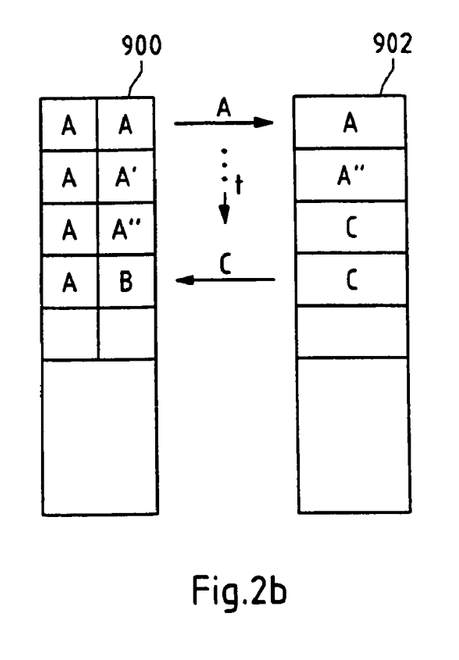

FIG. 2b depicts a method consistent with the principles of the present invention. As shown in FIG. 2b, in at least one embodiment, BIOD A may be stored within system 900 before being transmitted to system 902. As time progresses, BIOD A may be changed within system 900 to SOD B. Within system 902, BIOD A may be changed into MOD C. At a certain point in time, system 902 re-transmits MOD C to system 900. As BIOD A has been changed in both systems 900, 902, a check may be performed to determine whether the data is still consistent. The check may be performed by comparing BIOD A, stored within system 900, and MOD C. If the consistency check operation stored within the respective packages of the data object produces a positive result, the packages and the data object may be merged. Otherwise, the inbound data object may be discarded or marked for manual consistency checks.

In FIG. 3a, an exemplary data structure of BIOD A, SOD B, and MOD C is depicted. Each data object may comprise data packages 302-n, 302a-n, 304a-n. Each data package may comprise such information as context data, data content, a system identification ID, and an object data state STATE, a consistency check operation OP, and at least one reaction R.

In any of these embodiments, the system identification ID may be used for identifying corresponding data objects, i.e., which inbound data object corresponds to a certain data object of the current system. The object state STATE, for example, may be used for checking whether an object has been changed prior to carrying out a consistency check operation. Only if an object has changed may such an operation be necessary.

To identify whether an object has been changed from a previous state, object status information may be stored within any data object. This status information may comprise information about when a data object has been changed such as, for example, a time stamp. By comparing the status information of a copy and a corresponding data object, it may be possible to determine whether the data object has been changed with respect to the copy.

If the status information of the copy and the data object are identical, no changes have occurred to the respective data objects. In that case, the data objects or the data packages may be merged without risk of losing any relevant data, as no data has been changed. If the status information in the data object differs from the status information in the copy, the data within the data object has been changed, and merging might result in loss of relevant data. Such a merging process may be monitored using methods consistent with the present invention.

As a data object may be comprised of many data, belonging to different categories, and being relevant to a lesser or greater degree, in certain embodiments, data objects may comprise a plurality of data packages. These data packages may combine data, for example, that belongs to the same category, or is equally relevant. Data packages of said first data object and said copy may be by compared sequentially or hierarchically. By comparing the packages hierarchically, a bottom up consistency check may be carried out, that is, a consistency check on the most relevant packages may be performed first, prior to checking the less relevant packages. Alternatively, the least relevant packages may be checked first and then the more relevant ones. By choosing the appropriate sequence of comparing packages, the merging process may be accelerated.

In certain embodiments, each of the data packages may be of a different relevancy or may comprise different data and may need to be handled differently. Therefore, in certain embodiments, at least parts of the object data, a consistency check operation description, and a reaction may be stored within the data package. For each group of object data or data package, a particular consistency check operation and the corresponding reactions may be stored. In certain instances when reducing data loss is important, a consistency check operation may compare all object data or data packages and produce a positive result if all object data or data packages are consistent. If the data within the package is identical, a positive result is produced, helping to ensure that no relevant information will be lost during merging the data objects.

For certain categories of data, such as less relevant data, a merging of data may still be desirable even if some of the data is not consistent and some is consistent. In this case, a consistency check operation may compare object data or data packages and produce a positive result if at least part of the object data or data packages is consistent.

If a package is consistent, which results in a positive consistency check, the resulting reaction may be any one of the group of: merge said second data object into said first data object, mark said first and/or said second data object, or packages of said data object for review, replace said first data object with said second data object. Merging the data objects or packages results in a new data object comprising data of said first data object and said second data object. If highly relevant data is the subject of the respective packages to be compared, a manual validation of the merging process may be initiated by marking the data objects for review. If, for example, only the most recent data is necessary, a first data object may be replaced by said second data object, if its state information indicates an earlier change date.

A consistency check operation may also have a negative result. In this case, the reaction may be any one of the group of: cancel all inbound data objects, marks said first and/or said second data object or packages of said data objects for review, replace said first data object with said second data object, or remain said first data object unchanged. Cancelling all inbound data means that it is not possible to merge the data objects at all, and any further processing of the data objects would result in serious data inconsistencies. To avoid this, all inbound data objects may be cancelled. It may also be possible to mark the data objects for manual review. It may also account for which data object has higher priority. If the second data object has higher priority, the first data object may be replaced by the second data object. If the first data object has higher priority, it may be kept and the second data object may be discarded.

In certain embodiments of the present invention, the copy of the data object may be stored within the originating system. If a data object from a distributed system is inbound to said originating system, the inbound data object may be compared with the stored copy and changes within said second data object may be identified. The result of the consistency check operation may be used for automatically merging said first and said second data object.

To provide a correct reaction for a respective result of a consistency check operation, it is proposed that said first data object and said second data object are processed according to a reaction assigned to the result of said consistency check operation and stored within the first data object, said second data object or said copy.

Figure 3B:
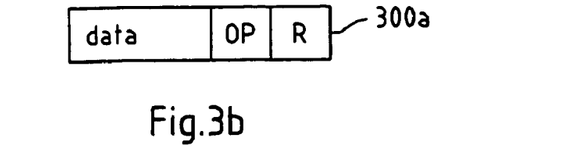

FIG. 3b depicts an exemplary data structure of one data package 300a, consistent with the principles of the present invention. As different data may need to be handled differently to preserve data integrity and consistency, a certain consistency check operation OP and a respective reaction R may be stored for each data package 300-304.

Figure 4:
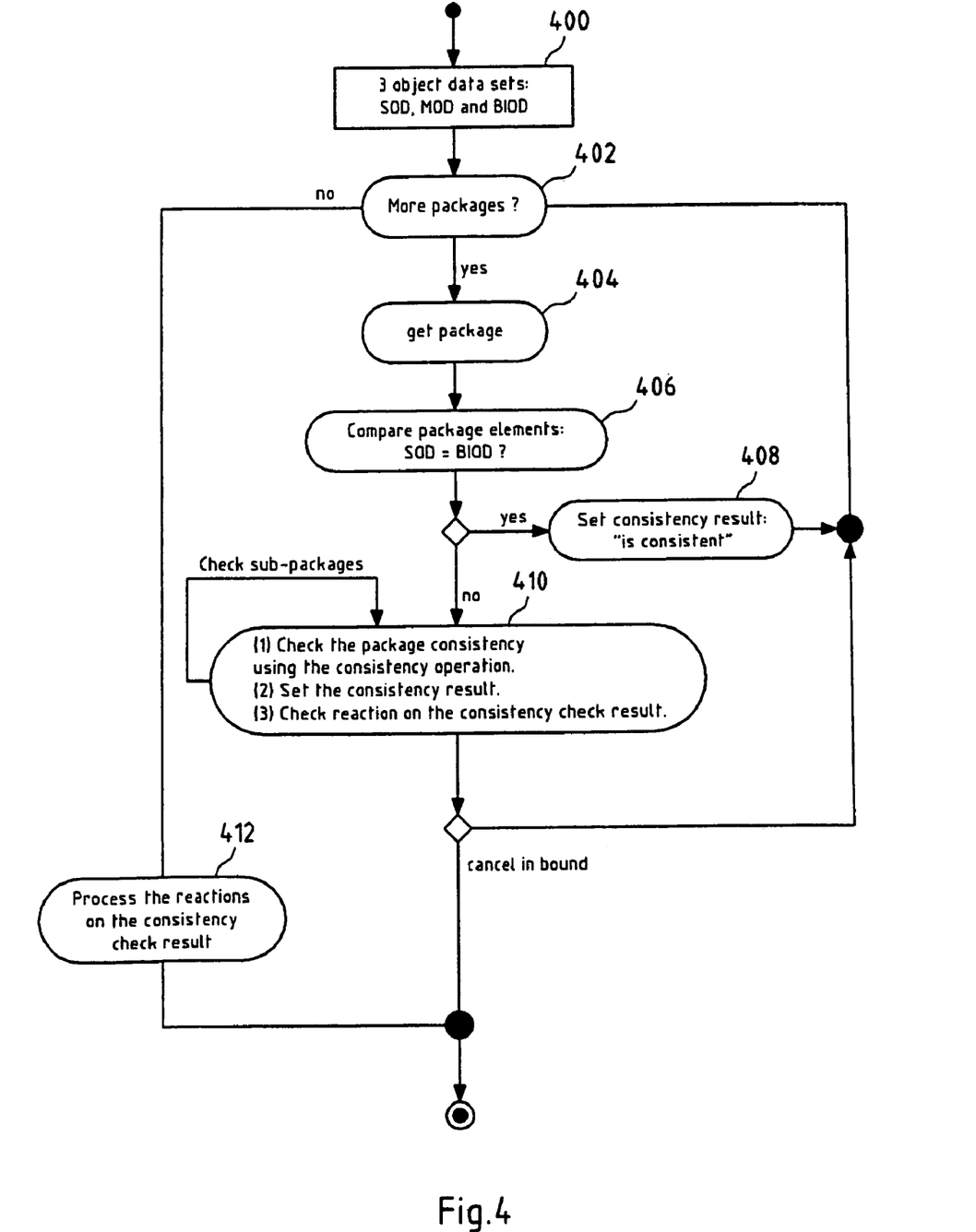
FIG. 4 is a flow chart illustrating one method of a consistency check operation, according to one or more embodiments of the present invention.

FIG. 4 depicts a flow chart illustrating one embodiment of the inventive method, as detailed below. After receiving an inbound MOD and BIOD in system 900, three object data sets (BIOD, SOD, and MOD) are available and may be used for a consistency check (step 400).

The data objects are checked to determine if they comprise any data packages not being consistency checked (step 402). If there are more packages to be checked, the respective packages of SOD and BIOD are retrieved (step 404). In step 406, the content of the package elements are compared. If the contents match, the consistency check results are set to "is consistent" (step 408).

If the contents do not match, a consistency check operation may be retrieved from the package (step 410) and the consistency check operation may be performed on the data of SOD and BIOD. Based on the data and the defined consistency check operation, a consistency check operation result is produced, and a reaction is retrieved from the data package. This reaction corresponds to the result of the consistency check operation. In step 410, all sub-packages of a package are consistency checked.

If the reaction for a certain consistency check operation result is cancelled inbound, the process is stopped. Otherwise, in step 402, it is again checked whether more packages are to be consistency checked. If no further packages are to be checked, the reaction corresponding to the respective consistency check operation results is retrieved from the packages and performed on the data (step 412). After all data objects have been merged, the consistency check operation is stopped.

A further aspect of the invention is a computer program product with a computer program stored thereon for checking data consistency of data objects of distributed systems within a computer network, a program comprising instructions operable to cause a processor to send a first data object from a first system to a second system, store a copy of said first data object within said second system, generate a second data object from said first data object, send said data object and said copy to said first system, compare at least one data package of said first data object with at least one data package of said received copy using a consistency check operation stored within said first data object, said second data object, or said copy.

Yet another aspect of the invention is a computer system for checking data consistency of data objects of distributed systems within a computer network, comprising sending means within a first computer for sending a first data object from a first system to a second system, storage means within a second computer for storing a copy of sad first data object within said second system, generation means within said second computer for generating a second data object from said first data object, sending means within said second computer for sending said second data object and said copy to said first system, and comparison means within said first computer for comparing at least one data package of said first data object with at least one data package of said received copy using a consistency check operation stored within said first data object, said second data object, or said copy.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

REFERENCE NUMBERS 100 computer program product
300 data package
302 data package
304 data package
900 computer
910 processor
920 memory
930 bus
940 input device
950 output device
960 user interface
970 program carrier
980 program signal
999 computer network system
A before-image object data BIOD
B system object data SOD
C message object MOD
ID system identification
STATE object data state
OP consistency check operation
R reaction

What is claimed is:

1. A method for checking data consistency of data objects of distributed systems within a computer network, comprising:
    receiving in a second system a copy of a first data object stored in a first system;
    storing the copy of the first data object within the second system;
    generating a second data object from the copy of the first data object;
    sending the second data object and the copy to the first system;
    comparing at least one data package of the first data object with at least one data package of the copy of the first data object sent by the second system using a consistency check operation stored within the first data object, the second data object, or the copy of the first data object;
    determining, based on the comparison, whether to merge the at least one data package of the first data object and the at least one data package of the copy of the first data object; and
    merging the data packages based on the determination.

2. The method of claim 1, wherein the first data object and the second data object are processed according to a reaction, dependent on the consistency check operation, stored within the first data object, the second data object, or the copy of the first data object.

3. The method of claim 1, further comprising storing, within the copy, a system identifier that identifies the first data object, an originating system of the first data object, or the first data object and the originating system of the first data object.

4. The method of claim 1, wherein object status information is stored within the copy.

5. The method of claim 1, wherein the data object comprises a plurality of data packages.

6. The method of claim 1, wherein the data packages are compared sequentially.

7. The method of claim 1, wherein the data packages are compared hierarchically.

8. The method of claim 1, wherein a consistency check operation description and at least one reaction are stored within a data package to be compared, wherein the data package to be compared can be a data package of the first data object, the second data object, or the copy of the first data object.

9. The method of claim 1, wherein the consistency check operation compares object data included within the data packages and characterizes the data objects as consistent in the event that all object data are consistent.

10. The method of claim 1, wherein the consistency check operation compares object data included within the data packages and characterizes the data objects as consistent in the event that at least some of the object data are consistent.

11. The method of claim 1, further comprising executing a reaction in the event that the consistency check operation characterizes the data objects as consistent, wherein the reaction includes an action selected from the group consisting of: merging the second data object into the first data object, marking the first data object for review, marking the second data object for review, marking the first data object and the second data object for review, marking the packages of the data objects for review, and replacing the first data object with the second data object.

12. The method of claim 1, further comprising executing a reaction in the event that the consistency check operation does not characterize the data objects as consistent, wherein the reaction includes an action selected from the group consisting of: canceling the second data object, and the copy of the first data object, marking the first data object for review, marking the second data object for review, marking the first data object and the second data object for review, marking the packages of the data objects for review, replacing the first data object with the second data object, and maintaining the first data object unchanged.

13. A method for checking data consistency of data objects of distributed systems within a computer network, comprising:
sending a first data object from a first system to a second system;
storing a copy of the first data object within the first system;
generating a second data object from the first data object;
sending the second data object to the first system;
comparing a data package of the copy of the first data object as originally stored with a data package of the second data object sent by the second system using a consistency check operation stored within the first data object, the second data object, or the copy of the first data object;
determining, based on the comparison, whether to merge the data package of the second data object and the data package of the copy of the first data object; and
merging the data packages based on the determination.

14. The method of claim 13, wherein the first data object and the second data object are processed according to a reaction, dependent on a consistency check operation, stored within the first data object, the second data object, or the copy of the first data object.

15. The method of claim 13, further comprising storing, within the copy, a system identifier that identifies the first data object, an originating system of the first data object, or the first data object and the originating system of the first data object.

16. The method of claim 13, wherein object status information is stored within the copy.

17. The method of claim 13, wherein the data object comprises a plurality of data packages.

18. The method of claim 13, wherein the data packages are compared sequentially.

19. The method of claim 13, wherein the data packages are compared hierarchically.

20. The method of claim 13, wherein a consistency check operation description and at least one reaction are stored within a data package to be compared, wherein the data package to be compared can be a data package of the first data object, the second data object, or the copy of the first data object.

21. The method of claim 13, wherein the consistency check operation compares object data included within the data packages and characterizes the data objects as consistent in the event that all object data are consistent.

22. The method of claim 13, wherein the consistency check operation compares object data included within the data packages and characterizes the data objects as consistent in the event that at least some of the object data are consistent.

23. The method of claim 13, further comprising executing a reaction in the event that that the consistency check operation characterizes the data objects as consistent, wherein the reaction includes an action selected from the group consisting of: merging the second data object into the first data object, marking the first data object for review, marking the second data object for review, marking the first data object and the second data object for review, marking the packages of the data objects for review, and replacing the first data object with the second data object.

24. The method of claim 13, further comprising executing a reaction in the event that the consistency check operation does not characterize the data objects as consistent, wherein the reaction includes an action selected from the group consisting of: canceling the second data object, and the copy of the first data object, marking the first data object for review, marking the second data object for review, marking the first data object and the second data object for review, marking the packages of the data objects for review, replacing the first data object with the second data object, and maintaining the first data object unchanged.

25. A computer readable medium storing instructions that, when executed by a computer, cause the computer to perform a method for checking data consistency of data objects of distributed systems within a computer network, the method comprising:
receiving, in a second system, a copy of a first data object stored in a first system;
storing the copy of the first data object within the second system;
generating a second data object from the copy of the first data object;
sending the second data object and the copy of the first data object to the first system;
comparing at least one data package of the first data object with at least one data package of the copy of the first data object sent by the second system using a consistency check operation stored within the first data object, the second data object, or the copy of the first data object;
determining, based on the comparison, whether to merge the at least one data package of the first data object and the at least one data package of the copy of the first data object; and
merging the data packages based on the determination.

26. The computer readable medium of claim 25, comprising instructions operable to cause the computer to process the first data object and the second data object according to a reaction, dependent on a consistency check operation, stored within the first data object, the second data object, or the copy of the first data object.

27. The computer readable medium of claim 25, comprising instructions operable to cause the computer to store, within the copy, a system identifier that identifies the first data object, an originating system of the first data object, or the first data object and the originating system of the first data object.

28. The computer readable medium of claim 25, comprising instructions operable to cause the computer to store object status information within the copy.

29. The computer readable medium of claim 25, comprising instructions operable to cause the computer to store data of the data object in a plurality of data packages.

30. The computer readable medium of claim 25, comprising instructions operable to cause the computer to compare the data packages sequentially.

31. The computer readable medium of claim 25, comprising instructions operable to cause the computer to compare the data packages hierarchically.

32. The computer readable medium of claim 25, comprising instructions operable to cause the computer to store a consistency check operation description and at least one reaction within a data package to be compared, wherein the data package to be compared can be a data package of the first data object, the second data object, or the copy of the first data object.

33. The computer readable medium of claim 25, comprising instructions operable to cause the computer to utilize the consistency check operation to compare object data included within the data packages and to characterize the data objects as consistent in the event that all object data are consistent.

34. The computer readable medium of claim 25, comprising instructions operable to cause the computer to utilize the consistency check operation to compare object data included within the data packages and to characterize the data objects as consistent in the event that at least some of the object data are consistent.

35. The computer readable medium of claim 25, comprising instructions operable to cause the computer to execute a reaction in the event that that the consistency check operation characterizes the data objects as consistent, wherein the reaction includes an action selected from the group consisting of: merging the second data object into the first data object, marking the first data object for review, marking the second data object for review, marking the first data object and the second data object for review, marking the packages of the data objects for review, and replacing the first data object with the second data object.

36. The computer readable medium of claim 25, comprising instructions operable to cause the computer to execute a reaction in the event that the consistency check operation does not characterize the data objects as consistent, wherein the reaction includes an action selected from the group consisting of: canceling the second data object, and the copy of the first data object, marking the first data object for review, marking the second data object for review, marking the first data object and the second data object for review, marking the packages of the data objects for review, replacing the first data object with the second data object, and maintaining the first data object unchanged.

37. A computer system for checking data consistency of data objects of distributed systems within a computer network, the system comprising:

a first system having a first data object;

a second system connected to the first system, wherein the second system receives a copy of the first data object from the first system, stores the copy of the first data object, generates a second data object from the first data object, and sends the second data object and the copy of the first data object to the first system, which compares at least one data package of the first data object with at least one data package of the copy of the first data object received by the first system using a consistency check operation stored within the first data object, the second data object, or the copy of the first data object, determines, based on the comparison, whether to merge the at least one data package of the first data object and the at least one data package of the copy of the first data object, and merges the data packages based on the determination.

* * * * *